United States Patent [19]

Katsuta et al.

[11] Patent Number: 5,785,299

[45] Date of Patent: Jul. 28, 1998

[54] DIRECT-COUPLED SOLENOID VALVES

[75] Inventors: Hiroyuki Katsuta; Takashi Akimoto; Masamichi Tajima, all of Yawara-mura, Japan

[73] Assignee: SMC Corporation, Tokyo, Japan

[21] Appl. No.: 717,192

[22] Filed: Sep. 20, 1996

[30] Foreign Application Priority Data

Sep. 27, 1995 [JP] Japan ................. 7-273578

[51] Int. Cl.[6] ................................... F16K 31/12
[52] U.S. Cl. ................. 251/129.18; 137/125.27; 137/271
[58] Field of Search ............ 251/129.18, 129.15; 137/625.27, 269, 271

[56] References Cited

U.S. PATENT DOCUMENTS

| | | | |
|---|---|---|---|
| 1,822,668 | 9/1931 | Protzeller | 251/129.18 |
| 3,952,774 | 4/1976 | Loveless | |
| 4,530,486 | 7/1985 | Rusnak | 251/129.18 |
| 4,750,704 | 6/1988 | Brundage | 251/129.18 |
| 4,783,009 | 11/1988 | Coates | 251/129.18 |
| 4,834,337 | 5/1989 | Chorkey et al. | 251/129.18 |
| 5,092,365 | 3/1992 | Neff | 251/129.18 |

FOREIGN PATENT DOCUMENTS

| | | | |
|---|---|---|---|
| 698160 | 11/1964 | Canada | 251/129.18 |
| 0 385 286 | 9/1990 | European Pat. Off. | |
| 2 050 620 | 12/1971 | Germany | |
| 23 40 304 | 2/1975 | Germany | |

*Primary Examiner*—Henry A. Bennett
*Assistant Examiner*—John Ball
*Attorney, Agent, or Firm*—Oblon, Spivak, McClelland, Maier & Neustadt, P.C.

[57] ABSTRACT

In a direct-coupled solenoid valve comprising an armature 27 of a solenoid control segment 3 that directly actuates a valve member 10 that opens and closes the passages between multiple ports, the armature 27 comprises an iron core 27a and a length setting member 27b that jointly set the core length L of the armature 27 to a switchable length according to the valve member 10.

2 Claims, 2 Drawing Sheets

5,785,299

DIRECT-COUPLED SOLENOID VALVES

TECHNICAL FIELD

This invention relates to direct-coupled solenoid valves whose valve member is directly opened and closed by the armature of the solenoid control segment.

PRIOR ART

A direct-coupled solenoid valve of known type comprises a main valve segment having multiple ports to pass a hydraulic fluid, a valve duct into which said ports open in an axial sequence, and a valve member movably fitted in the valve duct and opening and closing the passages between said ports, and a solenoid control segment having an armature operated by the on-off action of an exciting coil and directly opening and closing the valve member.

When the main valve and solenoid control segment segments of a direct-coupled solenoid valve of the type described above are connected together, the armature contacts one end of the valve member, either directly or through a suitable intermediate member, and the motion of the armature is directly transmitted to the valve member.

Therefore, the valve member of the main valve segment and the armature of the solenoid control segment must be of such size that the valve member and armature come into contact with certainty. When the valve members of the main valve segments have different lengths or stop at different points at the end of the stroke, therefore, multiple solenoid control segments having armatures of correspondingly different sizes have been required.

The need to use solenoid control segments and, in particular, armatures of different sizes has introduced considerable complications in the design and manufacture of solenoid valves and inconveniences in their handling.

Besides, the armatures requiring high dimensional accuracy have been difficult and costly to design and manufacture.

SUMMARY OF THE INVENTION

A primary object of this invention is to provide an armature having an iron core whose length is adjustable to the length of the valve member and the stop position at the end of the stroke in a direct-coupled solenoid valve whose armature in the solenoid control segment directly opens and closes the valve member in the main valve segment.

Another object of this invention is to provide an armature having a core whose length is adjustable as required so that one solenoid control segment can be used with multiple main valve segments whose valve members having different lengths or stopping at different points at the end of the stroke.

Still another object of this invention is to provide an inexpensive and reasonably designed armature of a direct-coupled solenoid valve by providing multiple functions to the member that determines the length of the iron core and incorporating an integral return mechanism therein.

To achieve the above objects, a direct-coupled solenoid valve according to this invention comprises a main valve segment having multiple ports to pass a hydraulic fluid, a valve duct into which said ports open in an axial sequence, and a valve member movably fitted in the valve duct and opening and closing the passages between said ports, and a solenoid control segment having an armature operated by the on-off action of an exciting coil and directly opening and closing the valve member. The armature in the solenoid control segment comprises an iron core and a length setting member attached thereto, and the iron core and the length setting member jointly set the size of the iron core to the desired one.

In an embodiment of this invention, the length setting member is attached to one end of the center hole in the iron core, with the tip of the length setting member protruding therefrom and contacting the end of the valve member, either directly or through an intermediate member.

It is preferable that a pressing member whose tip comes into contact with the stator is movably accommodated in the other end of the center hole of the iron core and a return spring is between the pressing member and the length setting member.

It is also preferable that the protrusion of the length setting member from the iron core is adjustable.

DETAILED DESCRIPTION

Figure 1:
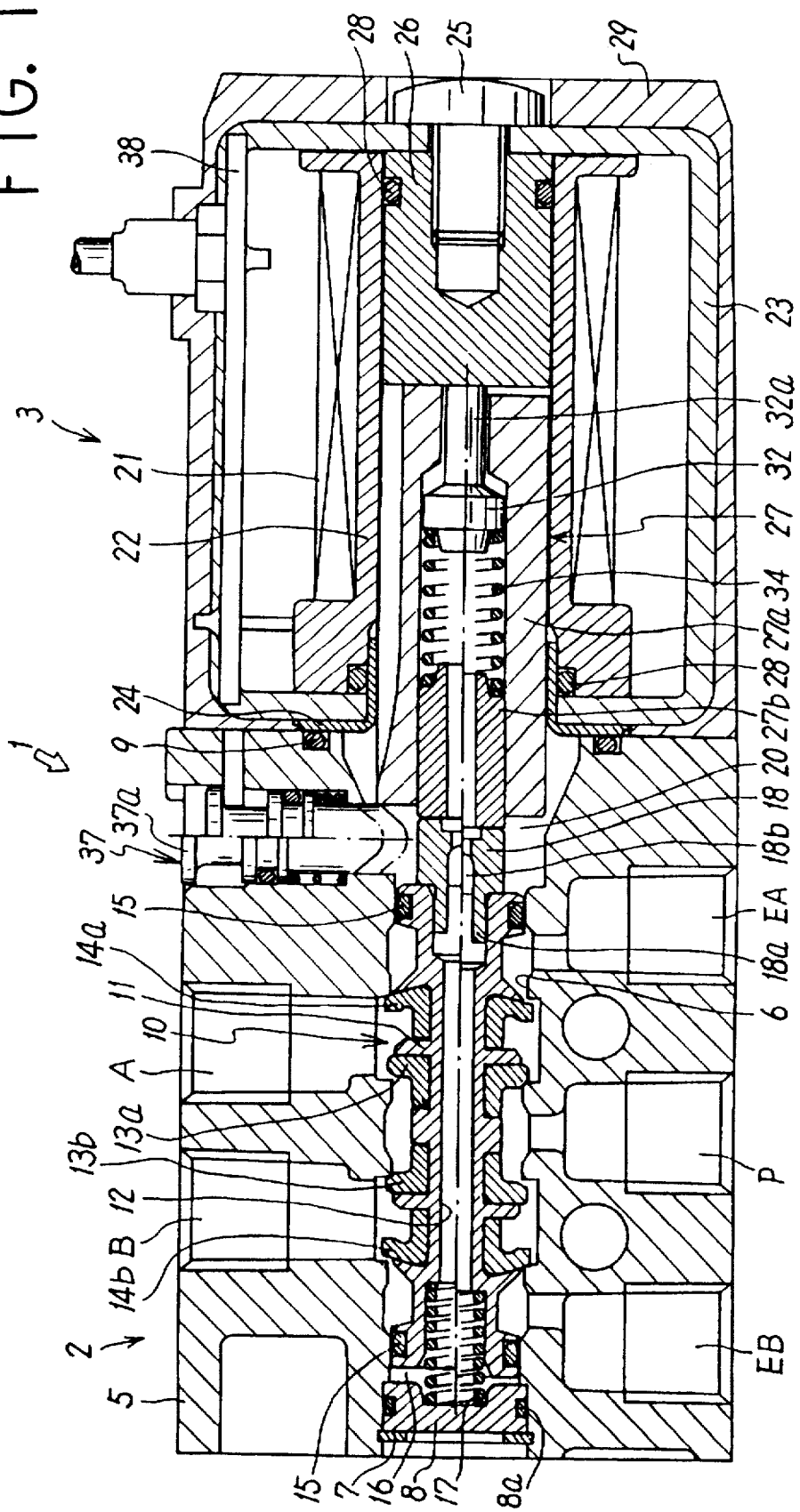
FIG. 1 is a longitudinal cross-sectional view of a direct-coupled solenoid valve embodying the principle of this invention.
Figure 2:
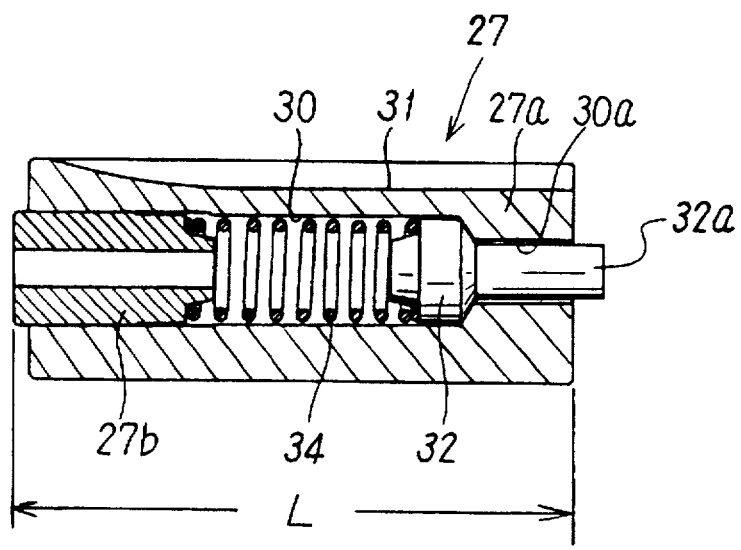
FIG. 2 is a longitudinal cross-sectional view of an armature in FIG. 1.

FIGS. 1 and 2 show an embodiment of this invention. A direct-coupled solenoid valve 1 comprises a main valve segment 2 and a solenoid control segment 3.

A valve casing 5 making up the main valve segment 2 has a supply port P to pass compressed air or other hydraulic fluid, output ports A and B disposed on both sides thereof, and discharge ports EA and EB on both sides of the output ports. These ports open into a valve duct 6 axially in the order mentioned. One end of the valve duct 6 is closed by a closing member 8, while the other end is closed by the solenoid control segment 3. Reference numeral 7 designates a snap ring to fasten the closing member 8, 8a a sealing member fitted around the closing member 8, and 9 a sealing member sealing the space between the valve casing 5 and the solenoid control segment 3.

A movable valve member 10 in the valve duct 6 comprises a valve stem 11 having an axial through hole 12 in the center there, poppet type valve sealing members 13a, 13b, 14a and 14b fitted around the valve stem 11, and guide rings 15 fitted around both ends of the valve stem 11. When the valve stem 11 moves axially in the valve duct 6, the valve sealing members 13a and 13b open and close the passages between the supply port P and the output ports A and B and the valve sealing members 14a and 14b open and close the passages between the output ports A and B and the discharge ports EA and EB.

A valve spring 17 that urges the valve member 10 toward the solenoid control segment 3 is compressed in a spring chamber 16 between the valve member 10 and the closing member 8.

The valve sealing members 13a, 13b, 14a and 14b are made of synthetic resin or other elastic material, while the guide rings 15 are made of polyamide, polyacetal or other resin.

An intermediate member 18 that indirectly and cushioning brings the valve member 10 and the armature 27 into contact the armature 27 is attached to one end of the valve member 10 that is closer to the solenoid control segment 3. The intermediate member 18 is a cylindrical member made of synthetic resin, hard rubber or other similar material and has a push-in tip 18a having a radial elasticity provided by means of multiple axial notches. The push-in tip 18a is elastically pressed in one end of the through hole 12 in the valve stem 11.

The intermediate member 18 is used as an aid when the space between the valve member 10 and armature 27 is too large to bring them into direct contact. Therefore, the valve member 10 and the armature 27 may be brought into direct contact with each other without using the intermediate member 18, depending on the space therebetween.

The spring chamber 16 at the other end of the valve member 10 communicates with a space 20 between the valve body 5 and the solenoid control segment 3 by means of the through hole 12 in the valve stem 11 and a passageway 18b provided in the intermediate member 18 and with the discharge ports EA and EB by means of the notches (not shown) provided in a part of the outer surface of the guide rings 15.

The solenoid control segment 3 comprises a bobbin 22 wound with an exciting coil 21, a magnetic frame 23 and a magnetic sheet 24 surrounding the bobbin 22, a stator 26 inserted into one end of the center hole in the bobbin 22 and fastened to the magnetic frame 23 with a bolt 25, and an armature 27 slidably inserted in the center hole in the bobbin.

The magnetic frame 23 is covered with a coating 29 of synthetic resin or other similar material and hermetically attached to one side of the valve body 5 with bolts or other fastening means not shown. Seal rings 28 hermetically seal the space between the bobbin 22 and the magnetic sheet 24 and between the center hole in the bobbin 22 and the armature 26.

The armature 27 comprises a cylindrical hollow iron core 27a having a center hole 30 and a length setting member 27b attached to the tip of the iron core 27a, as shown in FIG. 2. An axially extending groove 31 is formed in the outer surface of the iron core 27a, with the depth of the groove decreasing toward the space 20 in the main valve segment 2.

The center hole 30 in the iron core 27a has a smaller-diameter bore 30a at the end thereof closer to the stator 26. A pressing member 32 whose tip comes into contact with the stator 26 is slidably inserted in the end of the smaller-diameter bore 30a. The pressing member 32 has a smaller-diameter part 32a that is fitted in the smaller-diameter bore 30a. The length of the smaller-diameter part 32a is equal to the length of the protrusion from the smaller-diameter bore 30a toward the stator 26 when the pressing member 32 comes into contact with a step adjoining the smaller-diameter bore 30a at one end of the center hole 30 (see FIG. 2).

The length setting member 27b determines the core length L of the armature 27 required for switching the valve member 10 in conjunction with the iron core 27a. The length setting member 27b is cylindrical and fixed in position by tightly pressing into the end of the center hole 30 closer to the valve member 10. A proper length of the tip protrudes from the center hole to come into contact with the valve member 10 through the intermediate member 18. The distance L between the forward end of the length setting member 27b and the rear end of the iron core 27a is set as the length of the iron core of the armature 27. The core length L of the iron core can be freely changed by changing the protrusion of the length setting member 27b.

The length setting member 27b may be made of a magnetic material similar to the iron core 27b or synthetic resin, ceramic or other nonmagnetic materials.

A return spring 34 having a greater urging force than the valve spring 17 is compressed between the pressing member 32 and the length setting member 27b to urge the armature 27 toward the valve member 10 at all times.

Thus, the length setting member 27b has functions to determine the core length L of the armature 27, press the valve member 10 in contact therewith, and serve as a support for the return spring 34. With the pressing member 32 and return spring 34 integrally built in, the armature 27 is inexpensive and reasonably designed. This permits easier handling and assembling than the conventional assemblies in which individual parts are separately attached to the solenoid control segment 3.

Reference numeral 37 designates a manual operation mechanism that moves the armature 27 toward the stator 26 by depressing an operation button 37a, and 38 a printed circuit board for providing an electrical connection between an external power supply and the terminal of the exciting coil 21.

When no electric current is passed through the exciting coil 21, the tip of the smaller-diameter part 32a of the pressing member 32 comes into contact with the stator 26 and the armature 27 is returned by the urging force of the return spring 34, as indicated by the lower half of the armature 27 and the valve member 10 in FIG. 1. Therefore, the valve sealing members 13a and 13b cut off the passage between the supply port P and the output port A and open the passage between the supply port P and the output port B, while the valve sealing members 14a and 14b open the passage between the output port A and the discharge port EA and cut off the passage between the output port B and the discharge port EB.

When an electric current is passed through the exciting coil 21, the armature 27 is attracted to the stator 26 against the urging force of the return spring 34, as indicated by the upper part of the armature 27 and the valve member 10 in FIG. 1. With the valve member 10 urged to the right in the figure by the force of the valve spring 17, the valve sealing members 13a and 13b open the passage between the supply port P and the output port A and cut off the passage between the supply port P and the output port B, while the valve sealing members 14a and 14b cut off the passage between the output port A and the discharge port Ea and open the passage between the output port B and the discharge port EB.

Because the core length L of the armature 27 is determined by the iron core 27a and the length setting member 27b, the iron core 27a itself does not require very high dimensional accuracy. The core length L can be accurately determined by determining the protrusion of the length setting member 27b accurately. When joining together the main valve segment 2 and the solenoid control segment 3, the armature 27 can be brought into contact with the valve member 10 securely by adjusting the core length L according to the length and the stop position at the end of the stroke of the valve member 10.

Because the core length L of one armature 27 can be varied according to the valve member 10, one solenoid control segment 3 can be used with multiple main valve segments 2 with valve members 10 having different length and stop positions at the end of the stroke.

In the armature 27 of the embodiment described above, the length setting member 27b is fastened in the center hole 30 in the iron core 27 and, therefore, the protrusion thereof is unadjustable. However, it is possible to modify the embodiment by providing a length setting member 27b movable along the axis of the iron core 27b that permits the adjustment of the protrusion thereof. This permits free adjustment of the core length L of the armature 27.

Figure 3:
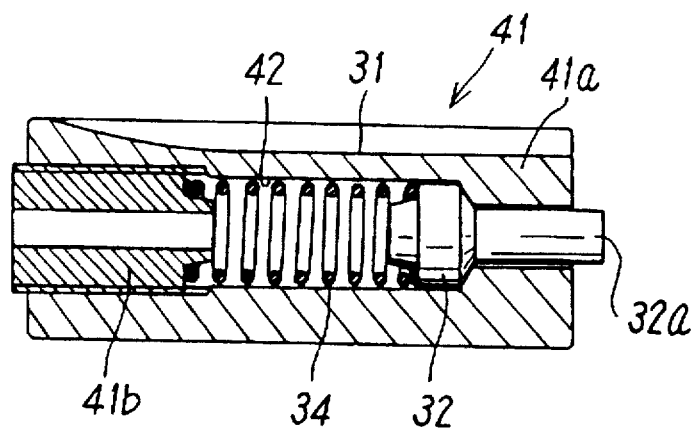
FIG. 3 is a longitudinal cross-sectional view of another embodiment of the armature.

FIG. 3 shows an armature 41 having a length setting member 41b whose protrusion is freely adjustable. Internal threads are cut on the inner surface of the center hole 42 in an iron core 41a, while external threads are cut on the outer surface of the length setting member 41b. Thus, the length setting member 41b freely moves back and forth in the center hole 42.

Therefore, the core length L of the armature 41 can be freely adjusted by stopping the length setting member 41b, which is movable along the axis of the armature 41, at a desired position. The length setting member 41b may be fixed at a desired position by bolts or other suitable fastening means so that the length setting member 41b does make unnecessary movements under the impact produced by the switching of the armature or other causes.

Because the other parts and actions of the armature 41 are substantially the same as those of the first embodiment described earlier, similar parts are designated by similar reference numerals, with detailed description omitted.

When the protrusion of the length setting member is freely adjustable, the core length of the armature can be easily and accurately set and adjusted. For example, pressure balance between two sets of valve sealing members 13a, 13b, 14a and 14b in the valve member 10 can be easily adjusted when required.

While the main valve segment in the embodiments described above is a five-port valve, a three-port valve or a four-port valve having common discharge ports can be used as well.

As described above, a direct-coupled solenoid valve according to this invention adjusts and sets the core length by a length setting member attached to an armature. Hence, the core length can be accurately determined according to the length or the stop position at the end of the stroke of the valve member in the main valve segment even if the iron core does not have very high dimensional accuracy. This permits bringing the armature into contact with the valve member with certainty.

Because, in addition, the core length L of one armature can be varied according to the valve member, one solenoid control segment can be used with multiple main valve segments with valve members having different lengths or stop positions at the end of the stroke.

What is claimed is:

1. A direct-coupled solenoid valve comprising:

a main valve segment having multiple ports to pass a hydraulic fluid, a valve duct into which the ports open in an axial sequence, and a valve member movably fitted in the valve duct and opening and closing the passages between said ports;

a solenoid control segment having an armature operated by the on-off action of an exciting coil and directly opening and closing the valve member;

an armature in the solenoid control segment, said armature having an iron core having a center hole, a length setting member fittable in the center hold such that said armature and said length setting member jointly determine the length of the iron core, wherein a tip of said length setting member protrudes from said center hold and comes into contact with one end of the valve member, a pressing member whose end comes into contact with the stator, movably accommodated in the center hole in the iron core; and a return spring compressed between the pressing member and the length setting member.

2. A direct-coupled solenoid valve according to claim 1, in which the protrusion of the length setting member from the iron core is freely adjustable.

* * * * *